INVENTOR
BILL B. HUGHES

United States Patent Office 3,533,697
Patented Oct. 13, 1970

3,533,697
WAVE HEIGHT MEASURING METHOD AND APPARATUS
Bill B. Hughes, Orlando, Fla., assignor to Electronic Communications, Inc., a corporation of New Jersey
Filed Apr. 1, 1966, Ser. No. 539,571
Int. Cl. G01c *3/08;* G01g *11/24*
U.S. Cl. 356—5
3 Claims

ABSTRACT OF THE DISCLOSURE

A method and apparatus for measuring the height of waves on the surface of a body of water from a moving aircraft over the water are described. A pair of prisms are downwardly directed from the aircraft toward the waves, with one prism fixed and the other cyclically and selectively scanned to periodically intersect the one prism sighting axis. Apparatus for detecting the amplitude of combined images is used to provide an electrical signal which is displayed in synchronism with the scanning of the other prism to provide a display pattern representative of the height of a wave.

---

Figure 1:
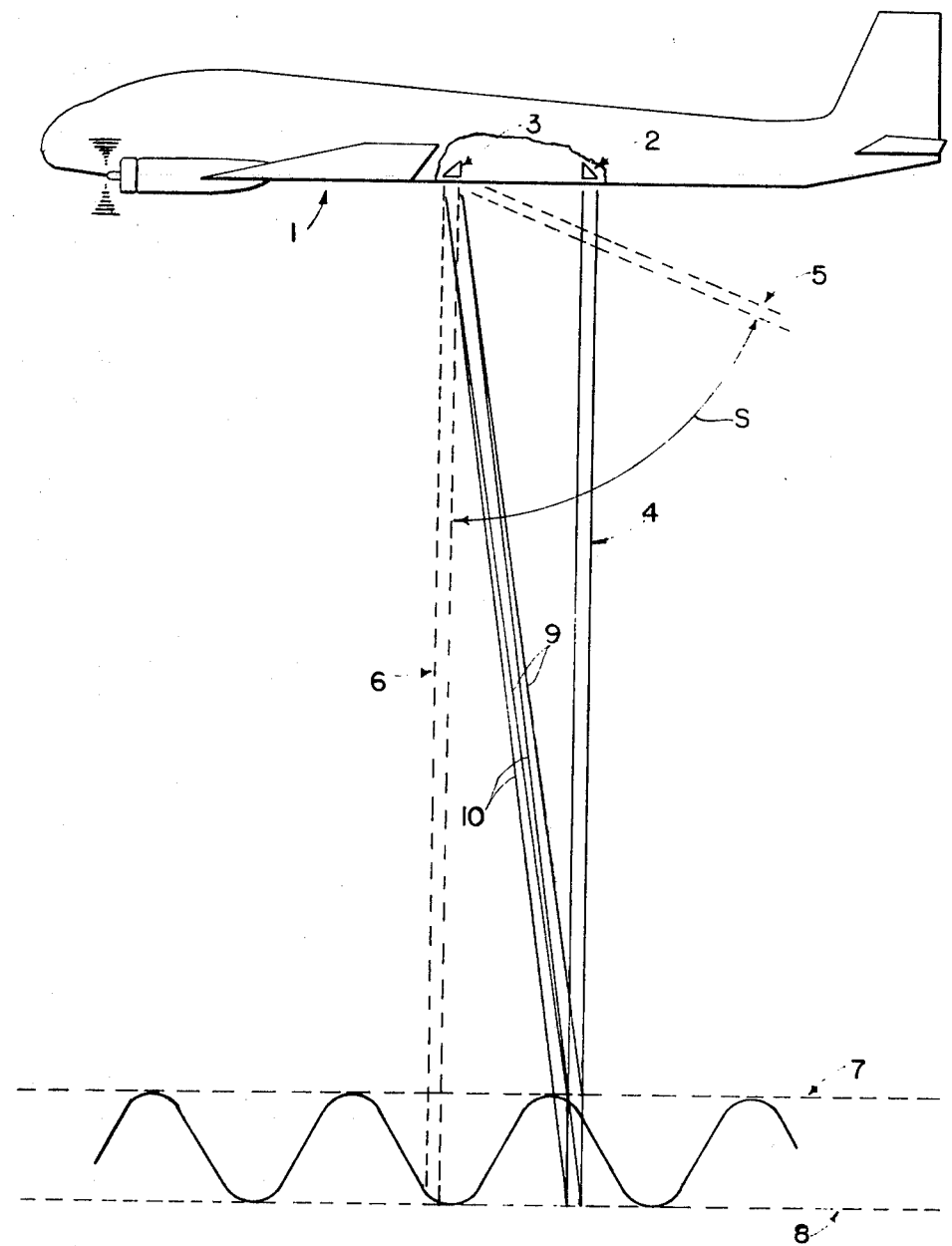

This invention relates to measurement of vertical dimensions and, more particularly, to a method and apparatus for measuring the height of waves in a body of water.

The determination of ocean wave height has become important to meteorologists who have the responsibility of disseminating navigation and safety information to the general public; to oceanographers; and to military personnel faced with the problem of determining whether or not a particular operation will succeed, especially a landing operation. Methods used in the past largely depend on estimation by eyesight, which is subject to judgment error, or on mechanical devices, wholly or partly immersed in the water, which are subject to considerable deterioration due to the deleterious action of the water. Either method has an apparent shortcoming where military operations are concerned, since it is necessary to risk detection and human life in sending an observer to spend some time in an area collecting data or installing a mechanical device.

Another approach which has inherent shortcomings of a different nature involves the use of reflected energy which originates from the device itself, as in the case of radar. In addition to being subject to enemy detection by electronic countermeasure devices, this approach requires substantial equipment and electrical power to generate and transmit the needed energy, in the necessary form, with the disadvantages of great size and weight.

An object of this invention is to provide an improved method for accurately measuring wave height, and apparatus for carrying out the method.

A further object of this invention is to provide a device for the measurement of wave height which is simple, rugged and capable of being produced relatively inexpensively.

A still further object is to provide a method and apparatus for wave height measurement requiring only minimal skill and training on the part of the operator, the apparatus providing a self-explanatory visual indication or display.

A further object is to provide a method for detecting and measuring wave height from a remote location, such as an aircraft flying over the body of water.

A still further object is to provide a device which emits no energy in its detecting function, thereby providing increased security in military uses and requiring minimum power.

In accordance with the invention, electromagnetic wave energy reflected from the surface of the body of water is employed in accordance with the basic principles of triangulation to derive wave height information. In practicing the method, the surface of the body of water is scanned by electromagnetic wave energy, which may be reflected visible light, travelling along two axes, one axis being maintained upright as a reference axis, the other being oscillated in a vertical plane which includes the upright axis. The crests of the waves can be considered as lying in a first horizontal plane, while the bottoms of the troughs of the waves can be considered as lying in a second horizontal plane spaced below the first, and the upright reference axis passes through both planes. Oscillation of the other axis is such that the two axes can intersect at the surface of the body of water only in the range determined by the two horizontal planes. Hence, the light or other scanning energy is derived from the same portion of the surface of the body of water for both axes only when the two axes intersect in the range just mentioned; at all other times, the scanning energy travelling along the two axes comes from different portions of the surface of the water. Separate outputs are derived from each scanning operation, each output varying in accordance with the surface portions being scanned, so that the output can be considered as "in phase" with each other when the energy along each axis is from the same surface portion, and as "out of phase" at all other times. The two outputs are combined, yielding a single varying quantity which is maximum only when the two axes intersect in the range defined by the crest plane and the trough plane. The period of the maximum value of the single quantity derived from the two outputs is detected as a function of the measurement of wave height. Using reflected light, for example, as the scanning energy, the two outputs can be obtained by optical projection of the light, and combining of the output can be accomplished by superimposing the two projected images.

In the apparatus embodiment of the invention, two separate scanning systems are employed. Typically, these may be optical systems each employing a prism to receive reflected light from the surface of the water, the light from the prisms being projected onto a single screen to provide the desired superimposed output images. In such embodiments, oscillation of one of the axes for the scanning energy can be accomplished by rocking one of the prisms. Advantageously, means including a suitable transducer is employed for deriving a single electrical signal from the combined scanning outputs, and this signal is used to generate a visible display, as on the screen of a cathode ray tube, which is calibrated so that wave height can be read directly in feet, for example. Where the apparatus is carried by an aircraft, it may serve also as an altimeter, and the display yields both altitude and wave height. Though it is particularly advantageous to have the apparatus carried by an aircraft flown over the body of water on a substantially horizontal course parallel to the direction of wave travel, stationary installations can be made in which the apparatus is supported by a mast or tower extending upwardly from the floor of the body of water and projecting above the water surface.

Figure 2:
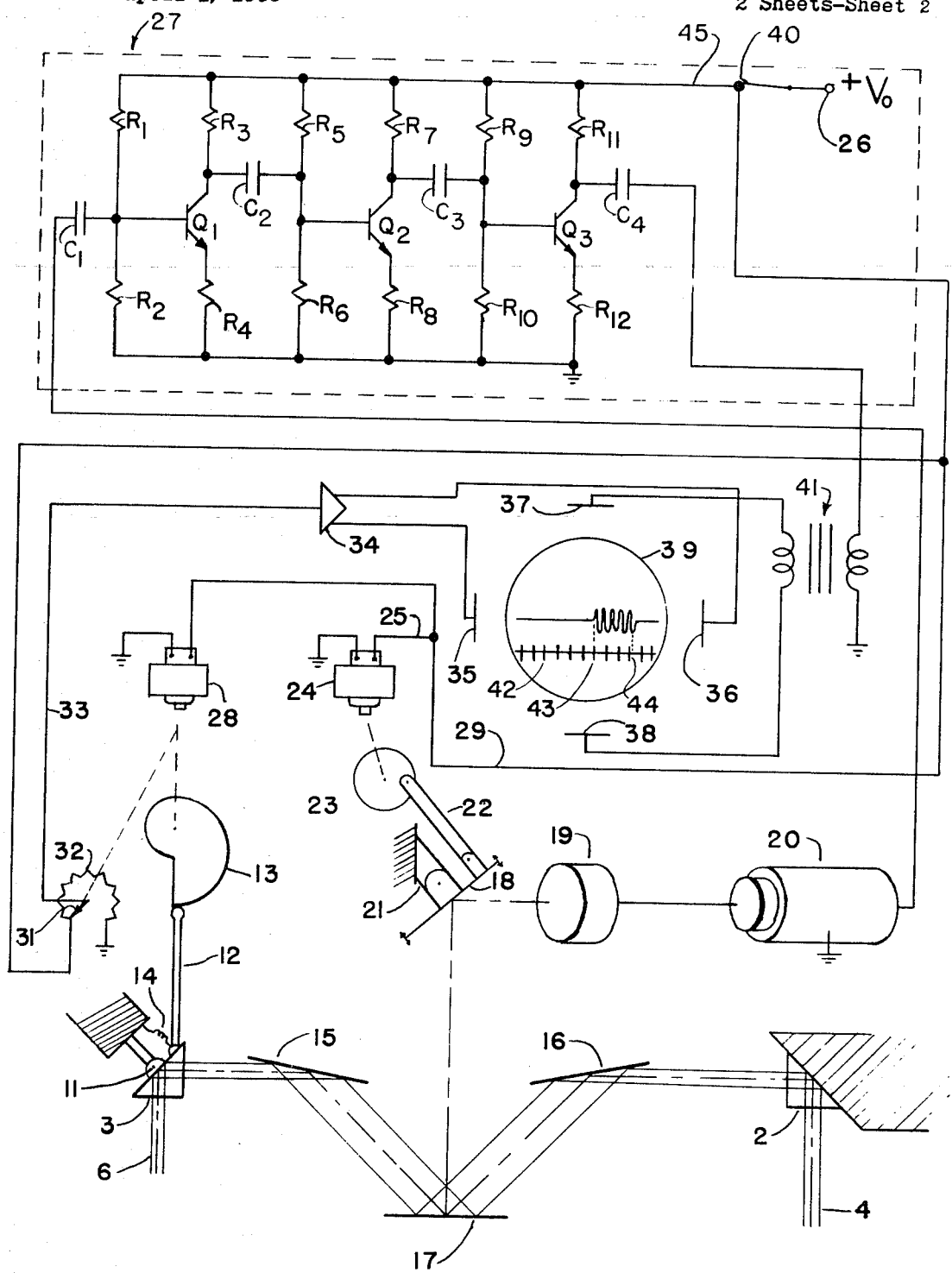

In order that the manner in which the foregoing and other objects are attained in accordance with the invention can be understood in detail, reference is had to the accompanying drawings, which form a part of this specification, and wherein:

FIG. 1 is a diagram of one embodiment of this device as carried by an airborne vehicle, and the relationship of the device and vehicle to the objects under surveillance; and FIG. 2 is a schematic diagram of one embodiment of the optical and electrical portions of the invention.

The method of the present invention will now be described with reference to the apparatus as shown in FIG. 1, the apparatus to be described in greater detail below. In the practice of this method, a first substantially vertical axis is established, as indicated generally at 4, as by an optical device indicated generally at 2. The optical device 2 is supported above the surface of a body of water having waves to be studied in a manner which permits relative motion between the supporting body and the waves. That motion is in a direction perpendicular to the axis between the supporting body and the waves to be measured, either as a result of motion of the supporting body, shown as an aircraft 1, or as a result of the wave velocity. The motion of the axis 4 is advantageously parallel to the direction of motion of the waves, but may be at some angle thereto, so long as that angle is less than 90°. It will be seen that as the axis 4 traverses the waves, it will scan the crests of the waves, which lie substantially in a plane indicated generally at 7, and will also scan the remaining portions of the waves including the troughs, all of which lie substantially in a plane indicated generally at 8.

A movable axis, indicated generally in four positions at 5, 6, 9, and 10, is established by an optical device 3 which is adapted to rotate about a substantially horizontal axis spaced from optical device 2 and in substantially the same horizontal plane as device 2. Optical device 3 is rotatable, or rockable, between fixed angular limits, allowing the movable axis to sweep through a sector, indicated generally at S, from the position indicated at 5 to that indicated at 6.

It will be seen that as the fixed axis 4 moves relative to the waves, electromagnetic radiation reflected from the surfaces of the waves will be received by device 2. Likewise, as the movable axis cyclically sweeps from position 5 to position 6, electromagnetic radiation will be received by device 3. It will be further seen that when the movable axis reaches the angular position 9, the images received by devices 2 and 3 will intermittently coincide only when a wave surface exists in plane 7, and that coincidence of images will then temporarily exist throughout the sweep of the movable axis until that axis leaves the position indicated at 10. At position 9, both devices 2 and 3 will be "viewing" a crest of a wave, and at position 10 both will be viewing a trough.

The magnitude of the angle between positions 9 and 10 of the movable axis is a function of the distance between planes 7 and 8, i.e., of wave height. Thus, two signals are independently developed by devices 2 and 3 as a result of the radiation received.

The remaining steps of the method can be advantageously explained with reference to the embodiment of the apparatus shown in FIG. 2, in which the axes are shown at 4 and 6. The images are redirected by devices 2 and 3 to two mirrors 16 and 15, respectively, by which the images are directed to a combining screen 17. During the portion of the sweep of the movable axis within which the images are out of phase, the images appearing on screen 17 will be fuzzy and indistinct, and the radiation reflected therefrom will be of relatively constant or even intensity. However, when the images are in-phase, the contrast increases radically as each is reinforced by the other.

The change in radiation contrast is detected by a transducer 20, which provides an electrical signal suitable for use with conventional display equipment. One type of display equipment, as shown at 39, is a cathode ray oscilloscope the trace of which is amplitude modulated by the signal from transducer 20. The desired information appears as a change in waveform magnitude, the greater magnitude occurring when the images are in-phase. The length of the high-amplitude portion of the trace will be proportional to the angle of sweep through which coincidence exists, and therefore a function of wave height. This length, indicated by the trace portion from 43 to 44, can be read as wave height, a calibrated scale 42 having been provided for convenience. Any given intersection of the fixed axis 4 and the movable axis may occur on the wave at any position on the wave between the crest and trough planes. Since the aircraft is moving in a direction along the waves, the sensing of the intersections of theses axes is a high-speed repetitive operation, which ensures that at some cycles, intersection of the axis will occur at all portions of the wave between planes 7 and 8. The increased contrast image produced on screen 17 as a result of the intersections of the fixed and movable axes is thus the sum of a repeated number of such intersections, and will be directly correlated to the distance between the crest and trough of the wave, to wit, the planes 7 and 8. It will now be understood that the length or period that the high amplitude portion appears is a function of the wave height.

Referring now to the structure of the apparatus in detail as shown in FIG. 2, it will be seen that the fixed and movable prisms are shown in spaced relationship, the two prisms being in essentially the same horizontal plane. Though, in the particular embodiment shown, no provision is made to maintain the prisms in a true horizontal plane as the attitude of the aircraft varies from that plane, the apparatus can easily be provided with any one of several well known "stable platform" devices to assure that the fields of view will always relate to true vertical.

Movable prism 3 is mounted to pivot about an axis 11 and is actuated by a cam follower arm 12, one end of which is pivotally attached to the prism, and the other end of which rides along the periphery of cam 13. The prism 3 is spring-biased in a counterclockwise direction (as viewed in FIG. 2) by a spring 14, thereby maintaining contact between follower arm 12 and cam 13.

As indicated diagrammatically in FIG. 2, the light entering fixed prism 2 changes in direction by approximately 90° and leaves the prism passing to a fixed mirror 16 disposed to reflect that light to a reflective screen indicated generally at 17. Similarly, the light entering movable prism 3 is directed onto a mirror 15 and, by that mirror, is reflected onto screen 17. Screen 17 may be of any of a number of materials which reflect a large percentage of the light incident upon it, for example, bead glass adhered to a fabric. It is essential to the operation of the device that mirrors 15 and 16 be so disposed as to reflect the light received from their respective prisms to the same point on screen 17 when the fields of view of the prisms are centered on the same object, that is, within the fields 9 and 10, as shown in FIG. 1. Under these circumstances, the light which will be reflected from screen 17 will be significantly greater at the points of coincidence of the two images than at any other points on the screen.

The light reflected from screen 17 is again reflected by a pivotable mirror 18 through a light-collecting lens 19, being then projected to a photoelectric transducer 20. Mirror 18 is pivotably mounted on a fixed member 21 and is also pivotally attached to a link 22, the other end of link 22 being pivotally attached to a crank point on a wheel 23. Wheel 23 is driven by a DC motor 24, one terminal of that motor being connected to ground and the other terminal being connected by way of a conductor 25 and power supply switch 40 to DC supply terminal 26. Whenever the equipment is energized by the closing of switch 40, motor 24 is energized, thereby driving wheel 23 and link 22 to cause mirror 18 to oscillate about its pivot point through a small angle. Photoelectric transducer 20 is provided with an aperture of somewhat smaller size than the available area of screen 17, and is therefore able to receive light from only a small portion of that screen at any one time. The oscillatory motion of mirror 18 serves to scan a predetermined area of screen 17, the light received from the screen being reflected to transducer 20, so that the transducer is provided with a light input, the intensity of which varies with time. It is evident that, if the circumstances are such that the images which impinge upon screen 17 coincide exactly, the contract of light reflected from the screen at the point of coincidence will be significantly greater than over the remainder of the screen area, and that the light reflected by mirror 18 to the photoelectric transducer will therefore vary in intensity considerably over one period of oscillation of the mirror. Conversely, if the images impinging upon screen 17 are not coincident, the image on the screen will be fuzzy and "out-of-phase" and will be spread out over a larger area, so that the greatest intensity of light reflected from screen 17 to transducer 20 will not be significantly different from the least intensity.

Transducer 20 may for example be a cell of the photovoltaic type, or a photoresistive type, supplied by a suitable voltage source, without departing from the intended scope of this invention, so long as the voltage output from the transducer varies in proportion to the impinging light. The output of transducer 20 is an AC signal, the amplitude of which is proportional to the degree of coincidence or focus of the images on screen 17. This output is connected to a capacitor $C_1$ at the input of an amplifier circuit indicated generally at 27, the operation of which will be described below.

Returning now to the movable prism 3 and its associated mechanical linkages, the cam 13 is driven by a DC motor 28, one terminal of which is connected directly to ground and the other terminal of which is connected by way of a conductor 29 to a selector switch 40. With the switch in its illustrated "height" position, conductor 29 is connected through the movable contact and one fixed contact of switch 40 to a DC supply terminal 26. With switch 40 in the position shown and with voltage supplied to terminal 26, motor 28 continuously rotates driving cam 13 in a counterclockwise direction, as viewed in FIG. 2. Cam follower 12 will then be caused to ride against the surface of the cam from the point of smallest radius to the point of largest radius, and thence across the sharp radial shoulder to the point of smallest radius again. Prism 3, controlled by the motion of cam follower 12, is thus driven in a clockwise direction until the cam rotates to present its shoulder to the cam follower, at which time the prism will be sharply brought to its most counterclockwise position. Coil spring 14 acts to return the prism to its fullest counterclockwise position, and to assure continuous contact of the cam follower arm 12 with the surface of cam 13.

Also driven by motor 28 is the wiper arm 31 of a potentiometer 32. Potentiometer 32 may be of a type which provides a linearly decreasing voltage throughout substantially 360° of rotation of the wiper 31. One terminal of potentiometer 32 is connected directly to ground, the other terminal being connected to DC supply terminal 26. As the wiper arm is rotated from the terminal connected to the DC supply toward the ground terminal, a continuously decreasing voltage appears between the wiper arm and ground. The mechanical linkage from motor 28 to the potentiometer and to the cam is such that one revolution of the cam occurs during one revolution of the potentiometer. Also, the cam and potentiometer wipers are so positioned that cam follower 12 passes over the shoulder of cam 13 at the same time that the wiper passes from the positive terminal to the ground terminal of potentiometer 32. As arm 12 follows the steadily increasing radius of cam 13, the wiper arm 31 picks off a steadily decreasing voltage around potentiometer 32.

The voltage appearing on wiper 31 is connected by way of conductor 33 to a conventional DC amplifier 34. Amplifier 34 provides two outputs, one output being connected to one of the horizontal deflection plates 35 of a cathode ray tube indicated generally at 39, the other output being connected to the other horizontal deflection plate 36. The voltage between the two outputs of amplifier 34 is in proportion to the voltage output at wiper 31 of potentiometer 32, and therefore varies directly with the angular motion of movable prism 3. The gain of amplifier 34 need only be adjusted to provide full deflection of the trace on the cathode ray tube when the voltage at wiper 31 is at a maximum. It will readily be seen that the trace on the cathode ray tube 39 will be swept across the face of the tube once for each rotation of cam 13. The tube 39 may be any conventional cathode ray tube, or, if desired, a cathode ray oscilloscope may be used, with conductor 33 connected directly to the horizontal input terminal, thereby eliminating amplifier 34.

The vertical deflection plates of cathode ray tube 39 are connected to the terminals of the secondary winding of a transformer 41, the excitation for the primary of transformer 41 being provided by amplifier circuit 27. Transformer 41 has a winding ratio on the order of 1:1, and is included solely to couple the output of amplifier 27 to the cathode ray tube deflection plates. The output of amplifier 27 is proportional to the signal provided by photoelectric transducer 20, altered only insofar as is necessary to provide the proper voltage level for operation of the cathode ray tube. Recalling at this point that the output of transducer 20 is an AC superimposed on a DC reference signal the AC amplitude of which is greatest when the images impinging upon screen 17 are in coincidence, and is least when these images are out of coincidence, it will be seen that the trace on cathode ray tube 39 will be deflected in a vertical direction only slightly when the images are out of coincidence and will be deflected significantly when the images are coincident. Tube 39 therefore presents a visible display of image coincidence related to a base of angular motion of movable prism 3. A scale 42, calibrated in feet, is provided on the face of tube 39, so that it is obvious to the observer that an object exists at some point 43 below the aircraft, and that the object terminates at a point 44 a number of feet below point 43. It is then obvious that the aircraft is above a plane including the top of the object a distance indicated by the distance from the beginning of the trace to point 43, and that the height of the object is the reading on scale 42 opposite point 44 minus the reading on scale 42 opposite point 43.

Amplifier 27 may be of the types well known in the art, example of which is described as follows: the AC output signal from transducer 30 is connected through a coupling capacitor $C_1$ to the base of an NPN transistor of a first of three amplifier stages. Transistor $Q_1$ is biased by series connected resistors $R_1$ and $R_2$ connected between ground and a positive supply conductor or bus 45, which is connected through a power switch 40 to a DC supply source 26.

The collector of transistor $Q_1$ is connected by way of a resistor $R_3$ to the positive bus 45 and the emitter by way of resistor $R_4$ to ground. The output of transistor $Q_1$ is coupled by way of a capacitor $C_2$ to the base of transistor $Q_2$ in the second amplifier stage. The collector and emitter of transistor $Q_2$ are connected via resistors $R_7$ and $R_8$ to the positive bus and ground, respectively, in a manner similar to stage one. The base of transistor $Q_2$ is connected to ground by way of resistor $R_6$. The output is coupled from the collector of transistor $Q_2$ by way of a capacitor $C_3$ to the base of transistor $Q_3$ in the third stage of AC amplification. The third stage is similar to the previous two, with series combination of resistors $R_9$ and $R_{10}$ providing base bias and resistors $R_{11}$ and $R_{12}$ being connected in the collector and emitter circuits, respectively.

The output of the third stage of amplification is taken from the collector of transistor $Q_3$ and fed through a coupling capacitor $C_4$ to one terminal of the primary winding of transformer 41, as previously described. Circuit 27 therefore acts as an AC amplifier, tailored to the requirements of the deflection plates of cathode ray tube 39.

While a certain advantageous embodiment has been chosen to illustrate the invention, it will be understood by those skilled in the art that various changes and modifications can be made therein without departing from the scope of the invention as defined in the appended claims. For example, the rate of movements of the optical device 3 may be controlled so that the movable axis sweeps at a constant vertical rate. Thus, the time duration of the maximum value of the signal derived from the transducer 20 becomes a function of the measurement of wave height. It is well known in the art that time duration may then be measured. It will also be understood that in accordance with the invention the electromagnetic wave energy may be in the visible portion of the spectrum as well as the non-visible portion, such as infrared radiation.

What is claimed is:
1. A method of measuring the height of waves in a body of water from a moving aircraft above the water, comprising the steps of
    optically sighting downwardly from the aircraft onto the waves along a reference axis fixed relative to the aircraft in a vertical direction, to form vertical images of waves located along the sighted axis,
    optically and cyclically scanning downwardly from the aircraft along a scanning axis within a plane including said reference axis and parallel with the direction of motion of the aircraft to cause periodic intersection of the scanning axis and the reference axis at locations along the waves and form scan images of wave portions along the scanning axis,
    combining the vertical and scan images in a common image plane to form maximum signals at the intersections of said scanning axis and said reference axis,
    optically scanning the image plane with an electro-optical detector,
    and displaying the amplitude of detected optical images in synchronism with the cyclic scanning, thereby to provide a display pattern representative of the height of waves.
2. An apparatus for measuring the height of waves on the surfface of a body of water from an aircraft moving above the water comprising
    a first prism movably mounted on the aircraft and having a scan sighting axis,
    a second prism affixed to the aircraft with an orientation selected to slight portions of the waves below the aircraft along a vertical axis and directing said sighted portions onto an image plane,
    means for cyclically scanning said first prism along with said scan signting axis in a plane including said vertical axis and the direction of movement of the aircraft to obtain periodic intersections of said vertical and scan sighting axes at locations on the waves.
    said first prism being selectively placed on the aircraft to provide a scanning image in an image plane, and said fixed prism being arranged to direct its sighted image within said image plane,
    electro-optical means for optically scanning said image plane and producing an electrical signal having a magnitude corresponding to the intensity of the combined images on said image plane from said first and second prisms,
    and means for displaying the electrical signal in synchronism with said cyclic scanning means, thereby to provide a display pattern representative of the height of waves.
3. The apparatus recited in claim 2, in which said scanning means includes
    a first motor,
    a cam driven by said first motor, said first prism being operatively cycled by said cam to provide the scanning motion of the first prism, and
    said electro-optic scanning means comprising a second motor, a mirror, and an electro-optical transducer optically coupled by said mirror to the combined images on said image plane, said mirror being cyclically oscillated by said second motor to scan the image plane, said first and second motors being parallel connected for synchronous display of the electrical signal.

References Cited
UNITED STATES PATENTS

| | | | |
|---|---|---|---|
| 2,216,716 | 10/1940 | Withem | 356—1 |
| 2,297,534 | 9/1942 | Brulin | 356—1 |
| 2,882,783 | 4/1959 | Blackstone | 356—28 |
| 2,905,758 | 9/1959 | Walker | 350—6 |
| 3,242,836 | 3/1966 | Bartsch | 356—120 |
| 2,167,803 | 8/1939 | Graham et al. | 88—23 X |
| 2,315,282 | 3/1943 | Snow | 88—1 |
| 2,995,059 | 8/1961 | Oehling | 88—14 |

RONALD L. WIBERT, Primary Examiner

J. ROTHENBERG, Assistant Examiner

U.S. Cl. X.R.

350—6; 73—290; 356—120